US008666724B2

(12) United States Patent
Yoshimura

(10) Patent No.: US 8,666,724 B2
(45) Date of Patent: Mar. 4, 2014

(54) TRANSLATION SUPPORT APPARATUS, TRANSLATION DELIVERY PERIOD SETTING METHOD, AND STORAGE MEDIUM

(75) Inventor: Masami Yoshimura, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 66 days.

(21) Appl. No.: 13/396,827

(22) Filed: Feb. 15, 2012

(65) Prior Publication Data
US 2012/0221320 A1 Aug. 30, 2012

(30) Foreign Application Priority Data
Feb. 28, 2011 (JP) ................................. 2011-042162

(51) Int. Cl.
G06F 17/28 (2006.01)
G06F 9/46 (2006.01)

(52) U.S. Cl.
USPC .............................................. 704/2; 718/100

(58) Field of Classification Search
USPC .............................................................. 704/2
See application file for complete search history.

(56) References Cited

U.S. PATENT DOCUMENTS

| 7,039,700 | B2 * | 5/2006 | Saeidi | 709/224 |
| 8,285,541 | B2 * | 10/2012 | Brun | 704/9 |
| 2006/0277332 | A1 * | 12/2006 | Yamashina | 710/62 |
| 2007/0050182 | A1 * | 3/2007 | Sneddon et al. | 704/2 |
| 2007/0192110 | A1 * | 8/2007 | Mizutani et al. | 704/277 |
| 2009/0241115 | A1 * | 9/2009 | Raffo et al. | 718/100 |
| 2012/0035905 | A1 * | 2/2012 | Brun | 704/2 |
| 2012/0185235 | A1 * | 7/2012 | Albat | 704/2 |
| 2012/0191457 | A1 * | 7/2012 | Minnis et al. | 704/260 |

FOREIGN PATENT DOCUMENTS

| JP | 3771159 | 4/2006 |
| JP | 2006-244252 | 9/2006 |
| JP | 3918725 | 5/2007 |
| JP | 4049299 | 2/2008 |
| JP | 2009-157882 | 7/2009 |

OTHER PUBLICATIONS

Konno et al., Translation Service Estimation Device, Sep. 30, 2004, machine translation version of JP, 2004-185171.*

* cited by examiner

Primary Examiner — David R Hudspeth
Assistant Examiner — Timothy Nguyen
(74) Attorney, Agent, or Firm — IPUSA, PLLC

(57) ABSTRACT

An apparatus includes a translation memory storing previously translated sentences in association with source sentences; a matching rate calculation unit comparing original sentences in an original text to be translated with the source sentences in the translation memory and thereby calculating matching rates of the original sentences to the source sentences; a counting unit counting numbers of words for the respective matching rates; an adjusting unit adjusting the numbers of words of the respective matching rates by multiplying the numbers of words by the corresponding coefficients defined in a coefficient table; a total-no-of-words calculation unit adding the adjusted numbers of words to obtain a total number of words of the original text; and a delivery period setting unit obtaining a value corresponding to the obtained total number of words from a delivery period table and setting the value as a delivery period for a translation of the original text.

9 Claims, 14 Drawing Sheets

FIG.4

TRANSLATION SUPPORT SYSTEM

TRANSLATION ORDER SCREEN

VENDOR: ▽ X TRANSLATION COMPANY

ORIGINAL TEXT: MFP-MANUAL.DOC  [VIEW]

TRANSLATION TYPE: ▽ ENGLISH → ▽ GERMAN

DELIVERY PERIOD:
- ● AUTOMATIC (RECOMMENDED): 13 DAYS / BY JANUARY 15, 2011   ⟵ 401
- ○ MANUAL: BY ▽ 2010 ▽ JANUARY ▽ 10

[QUOTATION]  [RESET]

FIG.6

| MATCHING RATE (%) | COEFFICIENT |
|---|---|
| 95-99 | 0.3 |
| 85-94 | 0.6 |
| 75-84 | 0.6 |
| 50-74 | 0.8 |
| 49-0 | 1 |

FIG.7

| DELIVERY PERIOD (DAYS) | NUMBER OF WORDS |
|---|---|
| 1 | ~2000 |
| 2 | 4000 |
| 3 | 6000 |
| ⋮ | ⋮ |
| 7 | 14000 |
| ⋮ | ⋮ |
| 10 | 20000 |
| ⋮ | ⋮ |
| 15 | 30000 |
| ⋮ | ⋮ |
| 20 | 40000 |
| ⋮ | ⋮ |

FIG.9

ORIGINAL SENTENCE: This manual uses the following methods.

SOURCE SENTENCE IN TRANSLATION MEMORY: This manual uses the following symbols.

→

FIVE WORDS MATCH AND ONE WORD DOES NOT MATCH

→ MATCHING RATE OF ORIGINAL SENTENCE (SIX WORDS) IS 83%

→ SIX WORDS WITH MATCHING RATE OF 83% ARE DETECTED

FIG.10

MANUAL (ORIGINAL TEXT)
CHAPTER 1

COUNTED NUMBERS OF WORDS

| | 100% | 95-99% | 85-94% | 75-84% | 50-74% | NO MATCH |
|---|---|---|---|---|---|---|
| CHAPTER 1 | 1528 | 1388 | 888 | 1191 | 0 | 8391 |
| CHAPTER 2 | 1532 | 1177 | 895 | 281 | 0 | 6588 |
| CHAPTER 3 | 1190 | 1848 | 600 | 924 | 0 | 6149 |

NUMBERS OF WORDS OTHER THAN THOSE WITH MATCHING RATE OF 100% ARE USED TO CALCULATE DELIVERY PERIOD

FIG.12

| | 100% | 95-99% | 85-94% | 75-84% | 50-74% | NO MATCH | TOTAL |
|---|---|---|---|---|---|---|---|
| CHAPTER 1 | 1528 | 416 | 533 | 715 | 0 | 8391 | 10091 |
| CHAPTER 2 | 132 | 353 | 537 | 189 | 0 | 6588 | 7664 |
| CHAPTER 3 | 1190 | 554 | 0 | 548 | 0 | 6149 | 7251 |
| | | | | | | | 25009 |

FIG.13

| | 95-99% | 85-94% | 75-84% | 74-50% | NO MATCH | TOTAL | SET DELIVERY PERIOD | ACTUAL DELIVERY PERIOD | TRANSLATION COMPANY | SOURCE LANGUAGE | TARGET LANGUAGE |
|---|---|---|---|---|---|---|---|---|---|---|---|
| MANUAL A | 1323 | 1070 | 1488 | 0 | 21128 | 25009 | 13 | 11 | X TRANSLATION COMPANY | ENGLISH | GERMAN |
| MANUAL B | 2352 | 2563 | 2652 | 102 | 42556 | 50225 | 26 | 23 | X TRANSLATION COMPANY | ENGLISH | GERMAN |
| MANUAL C | 1532 | 1232 | 1232 | 256 | 11698 | 15950 | 8 | 12 | Y TRANSLATION COMPANY | ENGLISH | FRENCH |
| MANUAL D | 1532 | 1200 | 1232 | 326 | 21698 | 25988 | 13 | 17 | Y TRANSLATION COMPANY | ENGLISH | FRENCH |
| MANUAL E | 2622 | 2292 | 1232 | 296 | 25698 | 32140 | 17 | 16 | Z TRANSLATION COMPANY | GERMAN | FRENCH |
| .. | .. | .. | .. | .. | .. | .. | .. | .. | .. | .. | .. |

FIG.14A

FOR X TRANSLATION COMPANY ~32a

| MATCHING RATE (%) | COEFFICIENT |
|---|---|
| 95-99 | 0.2 |
| 85-94 | 0.5 |
| 75-84 | 0.5 |
| 50-74 | 0.7 |
| 49-0 | 1 |

FIG.14B

FOR Y TRANSLATION COMPANY ~32b

| MATCHING RATE (%) | COEFFICIENT |
|---|---|
| 95-99 | 0.4 |
| 85-94 | 0.7 |
| 75-84 | 0.7 |
| 50-74 | 0.9 |
| 49-0 | 1 |

FIG.14C

FOR Z TRANSLATION COMPANY ~32c

| MATCHING RATE (%) | COEFFICIENT |
|---|---|
| 95-99 | 0.3 |
| 85-94 | 0.6 |
| 75-84 | 0.6 |
| 50-74 | 0.8 |
| 49-0 | 1 |

FIG.15A

ENGLISH TO GERMAN 32e

| MATCHING RATE (%) | COEFFICIENT |
|---|---|
| 95-99 | 0.2 |
| 85-94 | 0.5 |
| 75-84 | 0.5 |
| 50-74 | 0.7 |
| 49-0 | 1 |

FIG.15B

ENGLISH TO FRENCH 32f

| MATCHING RATE (%) | COEFFICIENT |
|---|---|
| 95-99 | 0.4 |
| 85-94 | 0.7 |
| 75-84 | 0.7 |
| 50-74 | 0.9 |
| 49-0 | 1 |

TRANSLATION SUPPORT APPARATUS, TRANSLATION DELIVERY PERIOD SETTING METHOD, AND STORAGE MEDIUM

CROSS-REFERENCE TO RELATED APPLICATION

The present application is based upon and claims the benefit of priority of Japanese Patent Application No. 2011-042162, filed on Feb. 28, 2011, the entire contents of which are incorporated herein by reference.

BACKGROUND OF THE INVENTION

1. Field of the Invention

An aspect of this disclosure relates to a translation support apparatus, a translation delivery period setting method, and a storage medium.

2. Description of the Related Art

When products, such as office automation (OA) equipment, are exported to a foreign country, their manuals in an original language (e.g., English) need to be translated into the language of the foreign country.

There exists a translation support system that can centrally manage, on the Web, a series of processes related to a manual translation project involving a manufacturer of a product and a translation company (see, for example, Japanese Patent No. 3771159 and Japanese Patent No. 4049299). Such processes may include preparing an original text of a manual for the product, placing an order for translation of the manual with the translation company, translating the manual, proofreading the translated manual, delivering the translated manual, publishing (editing or printing), and sending a bill.

More specifically, a manual translation project to be managed with such a translation support system may generally include the following steps:

(1) A manufacturer prepares an original text.
(2) The manufacturer places an order for translation of the original text with a translation company.
(3) The translation company translates the original text.
(4) A proofreader at the manufacturer proofreads the translated text.
(5) The translation company delivers the translated text to the manufacturer.
(6) The manufacturer prepares a manual based on the translated text using a desktop publishing system.
(7) The manufacturer pays the bill for the translation to the translation company.

(1) The manufacturer prepares an original text of a manual. For example, the original text may be prepared in Japanese. Alternatively, the original text may be prepared in English when it is to be translated into multiple languages.

(2) The manufacturer, for example, obtains quotations for translation of the original text from multiple translation companies via the translation support system and selects one of the translation companies based on the quotations. Then, the manufacturer places an order for translation of the original text with the selected translation company. Also in this step, a delivery period (a period of time necessary to complete the translation, or delivery time) of a translated text is determined based on the amount of translation work.

(3) When receiving the original text via the translation support system from the manufacturer, the translation company divides the original text into parts and assigns the parts to translators. The translators translate the assigned parts of the original text within the delivery period. Each translator accesses the translation support system via a Web browser, and efficiently translates the assigned part of the original text using a translation memory (described later) provided by the translation support system on a Web screen. When translation of all parts of the original text is completed, the translated text is sent via the translation support system to the manufacturer.

(4) On a Web screen of the translation support system, a proofreader of the manufacturer proofreads the translated text to find errors including translation errors. If an error is found in the translated text, the proofreader corrects the error by himself/herself, or asks the translation company to request the corresponding translator to correct the error and send a corrected translated text.

(5) After the proofreading, the final translated text (or translated manual) is formally delivered from the translation company to the manufacturer.

(6) The manufacturer (or the translation company) edits the final translated text (or translated manual) using a DTP application to prepare a PDF file.

(7) Then, the manufacturer creates a payment bill based on the performed translation work using the translation support system and pays a translation fee to the translation company based on the payment bill. Generally, a translation fee is calculated based on an amount of money obtained by multiplying the number of translated words by a price per word.

As described above, a translation support system can centrally manage a series of processes (or steps) in a translation project on the Web. Also, a translation support system provides various tools for supporting, for example, translators and proofreaders to efficiently perform their jobs.

For example, a translation tool including a translation memory is provided to support translators to efficiently translate text. The translation memory is a database (DB) storing previously translated sentences (translation data) in association with original sentences (hereafter, for descriptive purposes, original sentences in the translation memory may be referred to as source sentences). With the translation tool, when translating an original sentence, a translator can retrieve, from the translation memory, a previously translated sentence associated with a source sentence that is the same as or similar to the original sentence, and thereby automatically translate the original sentence using the retrieved previously translated sentence. Thus, with the translation tool, the translator needs to newly translate only those parts of an original text that cannot be automatically translated. Accordingly, the translation tool makes it possible to improve translation efficiency.

Here, when proofreading a translated text translated using the translation tool, it may be sufficient to proofread only the newly translated parts (i.e., parts other than those automatically translated using the translation memory) of the translated text. For this reason, a proofreading tool is provided to support proofreaders to efficiently proofread a translated text that is translated using the translation tool including the translation memory. The proofreading tool allows the proofreader to distinguish parts of a translated text that are automatically translated using the translation memory from parts of the translated text that are newly translated by the translator, and thereby allows the proofreader to proofread and edit only the newly translated parts.

Thus, the translation tool including the translation memory enables a translator to automatically translate an original sentence by retrieving, from the translation memory, a previously translated sentence associated with a source sentence that is the same as or similar to the original sentence, and thereby allows the translator to newly translate only parts of an original text that cannot be automatically translated.

Meanwhile, as described in step (2) above, a delivery period of a translated text is normally determined based on the amount of translation work, and the amount of translation work is normally determined based on the total number of words in an original text to be translated. When the amount of translation work is large, a long delivery period is set; and when the amount of translation work is small, a short delivery period is set.

Here, when a translation tool including a translation memory as described above is used, it may not be appropriate to determine the amount of translation work based on the total number of words in an original text. For example, assuming that the total number of words in an original text to be translated is 14000 and a translator can translate 2000 words per day, the delivery period is set at seven days. However, when the translation tool is used, since the translator may be able to automatically translate some parts of the original text using previously translated sentences retrieved from the translation memory, the delivery period may be reduced. Thus, when the translation tool is used, it is difficult to determine an appropriate delivery period based simply on the total number of words in an original text.

SUMMARY OF THE INVENTION

In an aspect of this disclosure, there is provided an apparatus including a storage unit configured to store an original text including original sentences to be translated, a coefficient table defining coefficients associated with matching rates, and a delivery period table defining values indicating numbers of days and associated with total numbers of words; a translation memory configured to store previously translated sentences in association with source sentences; a matching rate calculation unit configured to compare the original sentences with the source sentences in the translation memory and thereby calculate the matching rates of the original sentences to the source sentences; a counting unit configured to count the number of words in each of the original sentences after the matching rates are calculated and thereby obtain numbers of words for the respective matching rates; an adjusting unit configured to adjust the numbers of words of the respective matching rates by multiplying the numbers of words by the corresponding coefficients defined in the coefficient table; a total-no-of-words calculation unit configured to add the adjusted numbers of words of the respective matching rates to obtain a total number of words of the original text; and a delivery period setting unit configured to obtain a value corresponding to the obtained total number of words from the delivery period table and to set the obtained value as a delivery period for a translation of the original text.

BRIEF DESCRIPTION OF THE DRAWINGS

FIG. 4 is a drawing illustrating an example of an order screen;

FIG. 6 is an example of a coefficient table;

FIG. 7 is an example of a delivery period table;

FIG. 9 is a drawing used to describe how a matching rate is calculated;

FIG. 10 is a table illustrating exemplary results of counting the numbers of words for respective matching rates;

FIG. 12 is a table illustrating examples of total numbers of words adjusted according to matching rates;

FIG. 13 is a table illustrating exemplary delivery results;

FIGS. 14A through 14C are exemplary coefficient tables for respective translation companies; and FIGS. 15A and 15B are exemplary coefficient tables for respective target languages.

DESCRIPTION OF THE PREFERRED EMBODIMENTS

Preferred embodiments of the present invention are described below with reference to the accompanying drawings.

<System Configuration>

Figure 1:
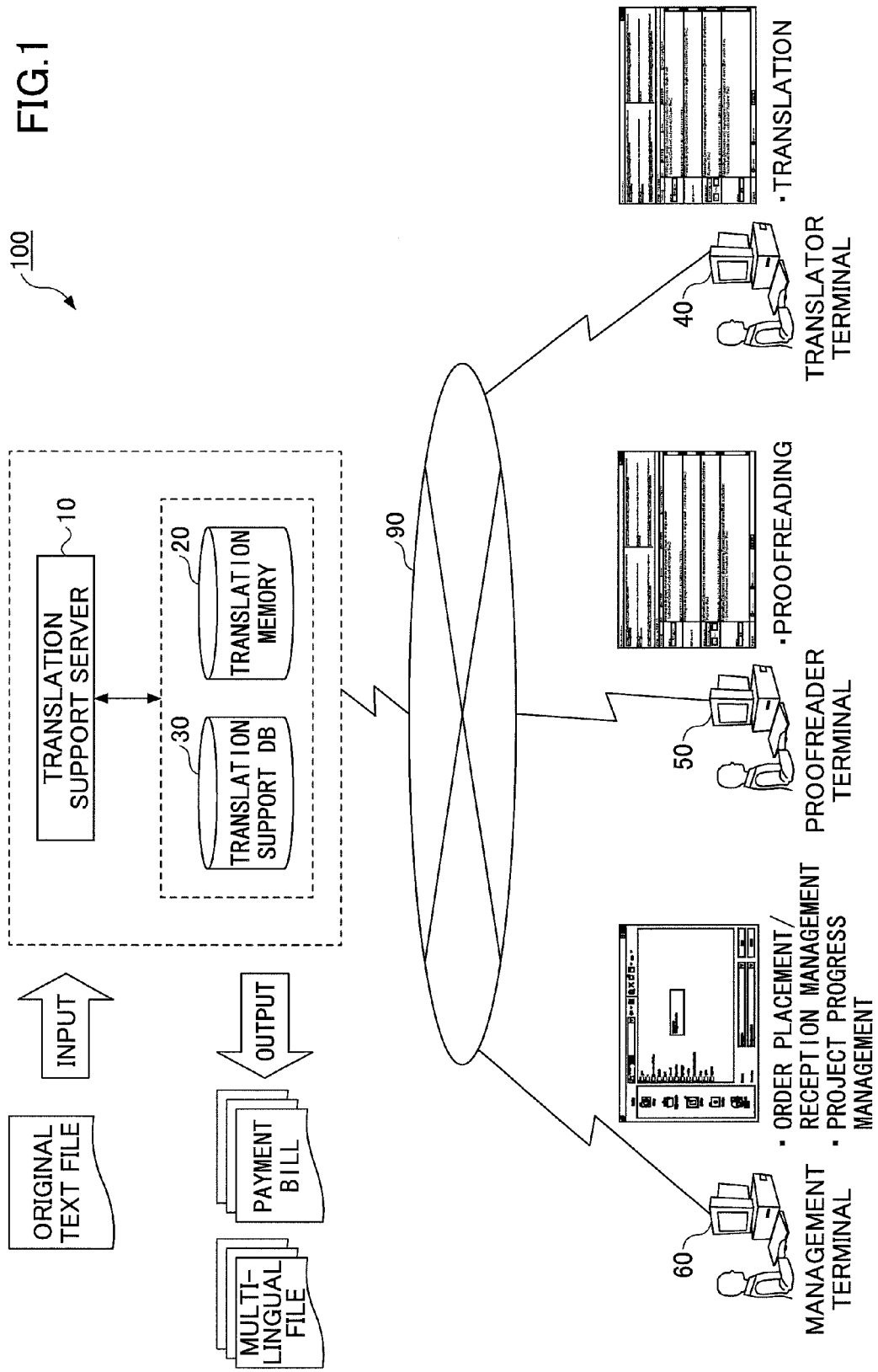
FIG. 1 is a drawing illustrating an exemplary configuration of a translation support system.

FIG. 1 is a drawing illustrating an exemplary configuration of a translation support system 100 according to an embodiment. As illustrated in FIG. 1, the translation support system 100 may include a translation support server 10, a translation memory 20, a translation support database (DB) 30, a translator terminal 40, a proofreader terminal 50, and a management terminal 60 that are connected to each other via a network 90. Although only one translator terminal 40, one proofreader terminal 50, and one management terminal 60 are illustrated in FIG. 1 for brevity, two or more terminals 40, 50, and 60 may be connected to the network 90.

The translation support server 10 is an example of a translation support apparatus according to an aspect of this disclosure, and provides translation support services for the translator terminal 40, the proofreader terminal 50, and the management terminal 60. The translation support server 10 enables a user (e.g., a person at a manufacturer who places an order for translation with a translation company) to centrally manage a series of processes related to a translation project on the Web via the management terminal 60. Such processes may include, for example, preparation of original text, placement of a translation order, translation, proofreading, delivery, publishing, and billing.

When an order for translation is placed via the management terminal 60, the translation support server 10 calculates and sets a delivery period (translation schedule) of the translation. Also, the translation support server 10 provides a translation support function using the translation memory 20 for the translator terminal 40. Further, the translation support server 10 provides a translation proofreading function for the proofreader terminal 50. In the present embodiment, the translation support server 10 uses the Web (or Web pages) as an interface for the terminals 40, 50, and 60. Therefore, the translation support server 10 also includes a function of a Web server.

The translation memory 20 is a database (DB) storing translated sentences (translation data) translated previously by translators in association with source sentences (i.e., original sentences of the translated sentences). The translation support server 10 searches the translation memory 20 for a source sentence that matches an original sentence to be translated. If a matching source sentence is found, the translation support server 10 retrieves a translated sentence stored in the translation memory 20 in association with the found source sentence. Thus, the translation support server 10 enables a translator (or the translator terminal 40) to automatically translate an original sentence by retrieving, from the translation memory 20, a previously translated sentence associated with a source sentence that is the same as or similar to the original sentence, and thereby allows the translator to newly translate only original sentences (or parts of the original sentences) that cannot be automatically translated.

The translation support DB 30 is a storage unit that stores original text data (original text file) to be translated, translated text data (multilingual file) that have been translated and have been proofread or to be proofread, data for managing progress of translation work, and tables (described later).

The translator terminal 40 is used by a translator for translation work and may be implemented, for example, by a personal computer (PC). The translator operates the translator terminal 40 to access the translation support server 10 via a Web protocol and thereby to display a translation screen on a Web browser. On the translation screen, an original sentence to be translated by the translator is displayed. Also, if a source sentence matching the original sentence is found in the translation memory 20, a translated sentence stored in the translation memory 20 in association with the matching source sentence is retrieved and displayed on the translation screen by the translation support function of the translation support server 10. Accordingly, an automatically-translated part (the entirety of a sentence or a part of a sentence) that has been automatically translated using a previously-translated sentence retrieved from the translation memory and/or a new translation part (the entirety of a sentence or a part of a sentence) that cannot be automatically translated and needs to be newly translated are displayed on the translation screen. The translator can improve the translation efficiency by translating only new translation parts.

The proofreader terminal 50 is used by a proofreader (e.g., of a manufacturer) for proofreading work and may be implemented, for example, by a personal computer (PC). The proofreader operates the proofreader terminal 50 to access the translation support server 10 via a Web protocol and thereby to display a proofreading screen on a Web browser. The proofreader proofreads translated sentences displayed on the proofreading screen. On the proofreading screen, an automatically-translated part (the entirety of a sentence or a part of a sentence) that has been automatically translated using a previously-translated sentence retrieved from the translation memory 20 and/or a newly-translated part (the entirety of a sentence or a part of a sentence) that could not be automatically translated and therefore has been newly translated by the translator are displayed. The proofreader can improve the proofreading efficiency by proofreading only newly-translated parts.

The management terminal 60 is used, for example, by a person in charge of a translation project at a manufacturer, and may be implemented by a personal computer (PC). The person in charge operates the management terminal 60 to access the translation support server 10 via a Web protocol and thereby to display a management screen on a Web browser. On the management screen, the person in charge can centrally manage a series of processes related to a translation project, such as preparation of an original text, placement of a translation order, translation, proofreading, delivery, publishing, and billing. The person in charge can also place an order for translation with a translation company on an order screen displayed on the Web browser of the management terminal 60. When placing an order on the order screen, the person in charge can set a delivery period (translation schedule) of the translation which is calculated automatically by the translation support server 10 based on original text data (or original text file).

The network 90 is, for example, the Internet and connects the translation support server 10 and the terminals 40, 50, and 60 for communications.

<Hardware Configuration>

Figure 2:
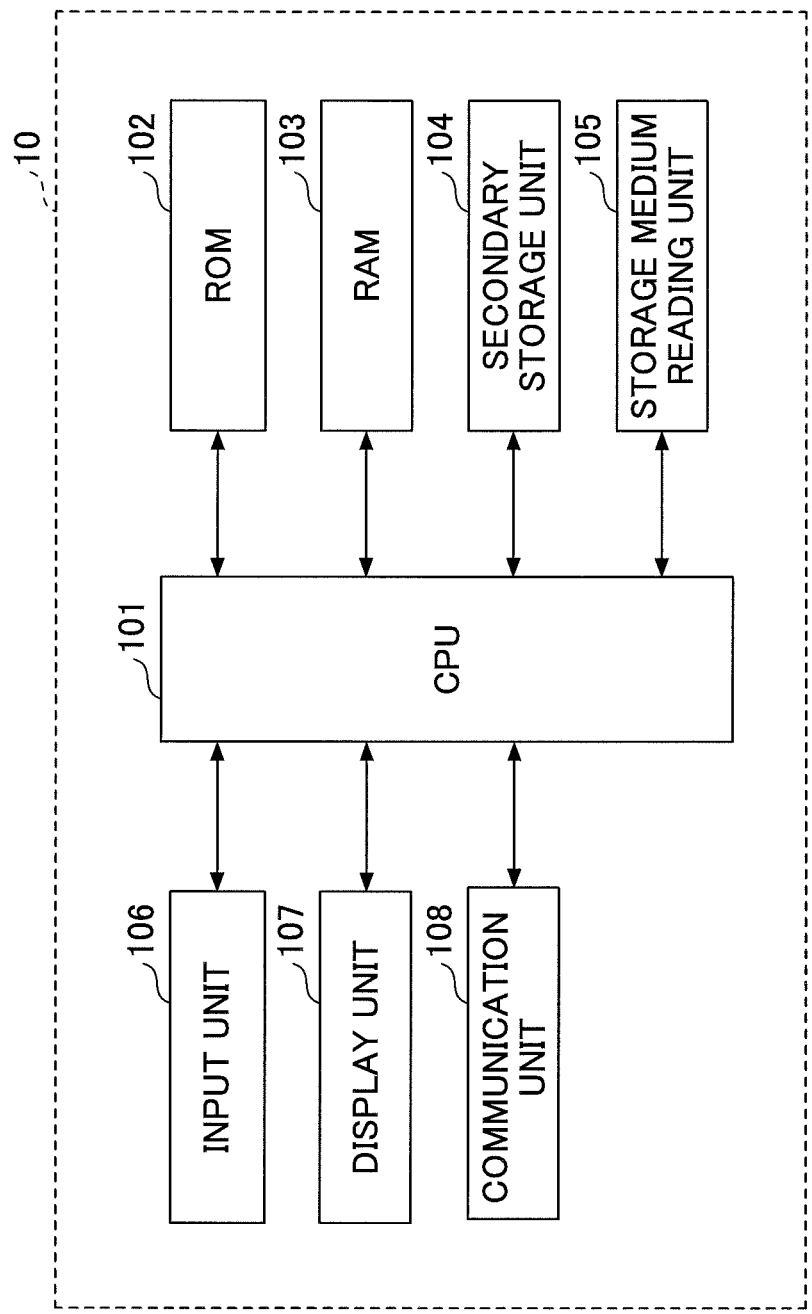
FIG. 2 is a block diagram illustrating an exemplary hardware configuration of a translation support server.

An exemplary hardware configuration of the translation support server 10 is described below. FIG. 2 is a block diagram illustrating an exemplary hardware configuration of the translation support server 10. The translation support server 10 may include a CPU 101, a read only memory (ROM) 102, a random access memory (RAM) 103, a secondary storage unit 104, a storage medium reading unit 105, an input unit 106, a display unit 107, and a communication unit 108.

The CPU 101 is circuitry including a microprocessor and its peripheral circuits, and controls the entire translation support server 10. The ROM 102 is a memory for storing control programs (software components) to be executed by the CPU 101. The RAM 103 is a memory used as a work area by the CPU 101 to execute the control programs (software components) loaded from the ROM 102 and thereby to perform various control processes.

The secondary storage unit 104 is a device for storing various data including a general-purpose operating system (OS) and translation support tools/programs, and may be implemented by a non-volatile storage medium such as a hard disk drive (HDD). The translation memory 20 and the translation support DB 30 may be stored in the secondary storage unit 104 or an external storage unit provided outside of the translation support server 10.

The input unit 106 is used for user inputs. The input unit 106 may include, for example, a mouse, a keyboard, and a touch panel switch placed over a display screen of the display unit 107. The display unit 107 may be implemented by a liquid crystal display (LCD) or a cathode ray tube (CRT) display.

The communication unit 108 enables the translation support server 10 to communicate with other apparatuses and devices via various types of wired and wireless networks including the network 90.

<Functional Configuration>

An exemplary functional configuration of the translation support server 10 is described below.

Figure 3:
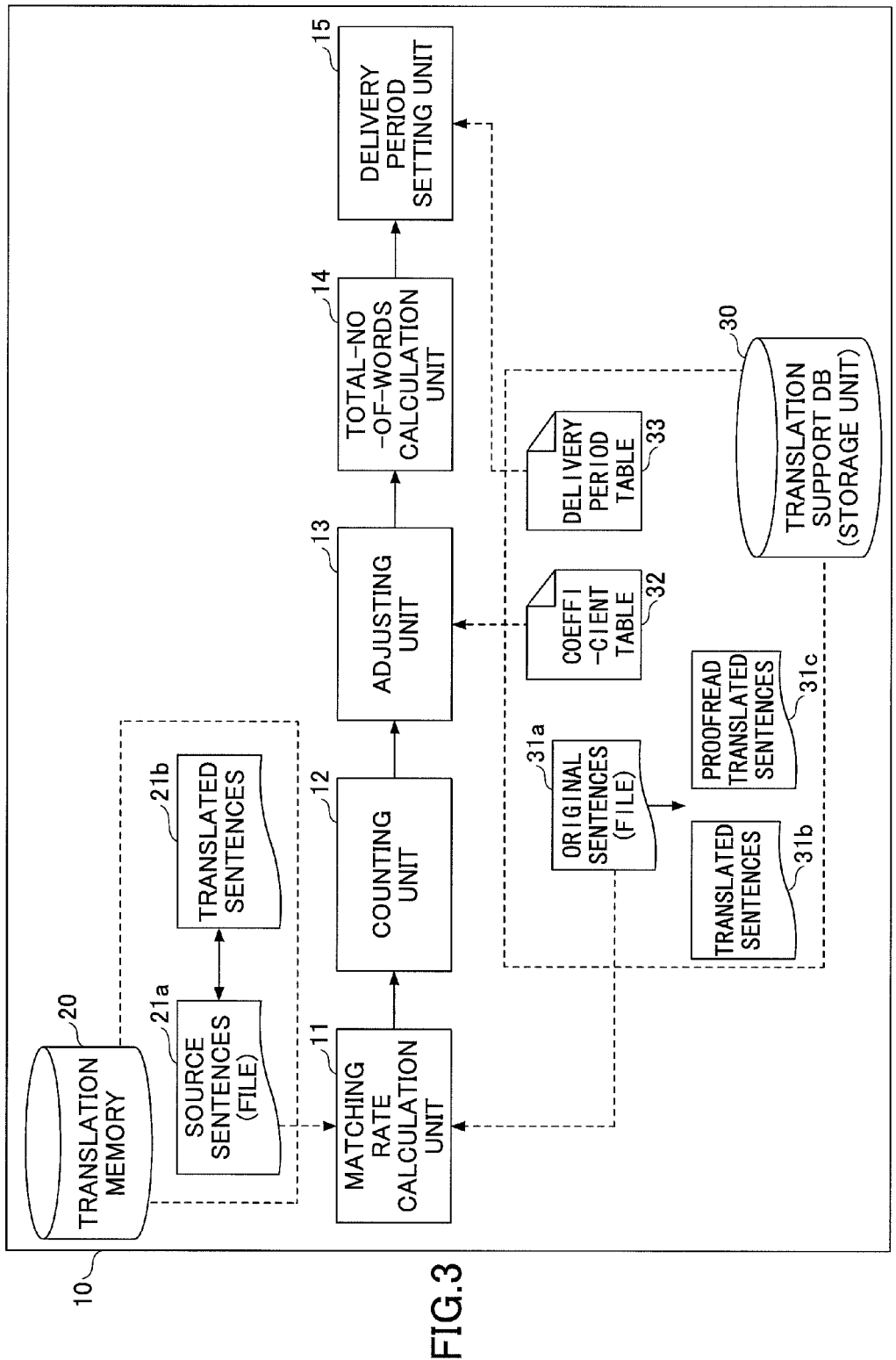
FIG. 3 is a block diagram illustrating an exemplary functional configuration of a translation support server.

FIG. 3 is a block diagram illustrating an exemplary functional configuration of the translation support server 10. The translation support server 10 may include, as functional units, a matching rate calculation unit 11, a counting unit 12, an adjusting unit 13, a total-no-of-words calculation unit 14, and a delivery period setting unit 15. The translation support server 10 may also include the translation memory 20 and the translation support DB 30. Alternatively, the translation support server 10 may be connected to an external storage unit storing the translation memory 20 and the translation support DB 30.

The translation memory 20 is a database (DB) storing previously translated sentences 21b in association with source sentences (source text file) 21a (i.e., original sentences of the translated sentences 21b). The translation support server 10 searches the translation memory 20 for a source sentence 21a that matches an original sentence 31a to be translated. If a matching source sentence 21a is found, the translation support server 10 retrieves a translated sentence 21b stored in the translation memory 20 in association with the found source sentence 21a. Thus, the translation support server 10 enables a translator (or the translator terminal 40) to automatically translate an original sentence 31a by retrieving, from the translation memory 20, a previously translated sentence 21b associated with a source sentence 21a that is the same as or similar to the original sentence 31a, and thereby allows the translator to newly translate only original sentences 31a (or parts of the original sentences 31a) that cannot be automatically translated.

The translation support DB 30 is a storage unit that stores, for example, the original sentences (original text file) 31a to be translated, currently translated sentences 31b that have been translated from the original sentences 31a, proofread translated sentences 31c that have been proofread, data for managing progress of translation work (not shown), a coefficient table 32 defining coefficients corresponding to thatching rates, and a delivery period table 33 defining delivery periods (numbers of days) corresponding to total numbers of words. The original sentences 31a are stored in advance in the translation support DB 30 by, for example, personnel of a manufacturer when placing an order for translation of the original sentences 31a. After the translation and proofreading processes, the translated sentences 31b and/or the proofread translated sentences 31c, which are the results of those processes, are stored as a multilingual file in the translation memory 20 for later use. In the translation memory 20, the translated sentences 31b and/or the proofread translated sentences 31c are stored in association with the original sentences 31a and information indicating newly-translated parts and automatically-translated parts. The coefficient table 32 and the delivery period table 33 are stored in advance in the translation support DB 30 by, for example, an administrator. Details of the coefficient table 32 and the delivery period table 33 are described later.

The matching rate calculation unit 11 compares the original sentences 31a (first sentences) with the source sentences 21a (second sentences) in the translation memory 20, and thereby calculates matching rates indicating how closely the original sentences 31a match the source sentences 21a. This process is described in more detail later.

The counting unit 12 counts the number of words in each of the original sentences 31a after the matching rates are calculated, and thereby obtains the numbers of words for the respective matching rates (or matching rate ranges). Said differently, the counting unit 12 totals (or sums) the numbers of words of the original sentences 31a for each matching rate or a matching rate range to obtain a total number of words with the matching rate or in the matching rate range.

The adjusting unit 13 multiplies the numbers of words of the respective matching rates by the corresponding coefficients in the coefficient table 32 to adjust the numbers of words.

The total-no-of-words calculation unit 14 adds the adjusted numbers of words of the respective matching rates and thereby calculates an adjusted total number of words of the original sentences 31a.

The delivery period setting unit 15 obtains, from the delivery period table 33, a value indicating the number of days that corresponds to the calculated total number of words, and sets the obtained value as the delivery period. When placing an order for translation via the management terminal 60, the delivery period (translation schedule) of the translation is automatically set and displayed on the order screen by the translation support server 10.

As described above, the translation support server 10 also provides translation support services (or functions) for the translator terminal 40, the proofreader terminal 50, and the management terminal 60 in various processes related to a translation project such as preparation of an original text, placement of a translation order, translation, proofreading, delivery, publishing, and billing. For example, the translation support server 10 includes a function to generate a management screen for personnel of a manufacturer, a function to generate a translation screen for a translator, a translation support function that supports the translator by retrieving the translated sentences 21b from the translation memory 20, a billing function to calculate a translation fee and issue a bill, and a management function to manage the entire schedule of a translation project.

The above described functional units and functions are implemented, for example, by executing programs by the CPU 101 of the translation support server 10.

<Order Screen>

FIG. 4 illustrates an exemplary order screen. When placing an order for translation in a translation project, a person in charge of the translation project at a manufacturer operates the management terminal 60 to access the translation support server 10 via a Web protocol and thereby to display an order screen on a Web browser. The person in charge selects a translation company from a "vendor" field. Next, the person in charge inputs a file name of an original text file to be translated in an "original text" field. Also, the person in charge specifies a source language and a target language in a "translation type" field. Then, the person in charge selects "Automatic (recommended)" 401 or "Manual" in a "delivery period" field. When "Automatic (recommended)" 401 is selected, the delivery period (translation schedule) is automatically set by the translation support server 10. Meanwhile, when "Manual" is selected, the person in charge needs to manually set the delivery period. In the present embodiment, it is assumed that "Automatic (recommended)" 401 is selected to set an appropriate delivery period.

<Translation Screen>

Figure 5:
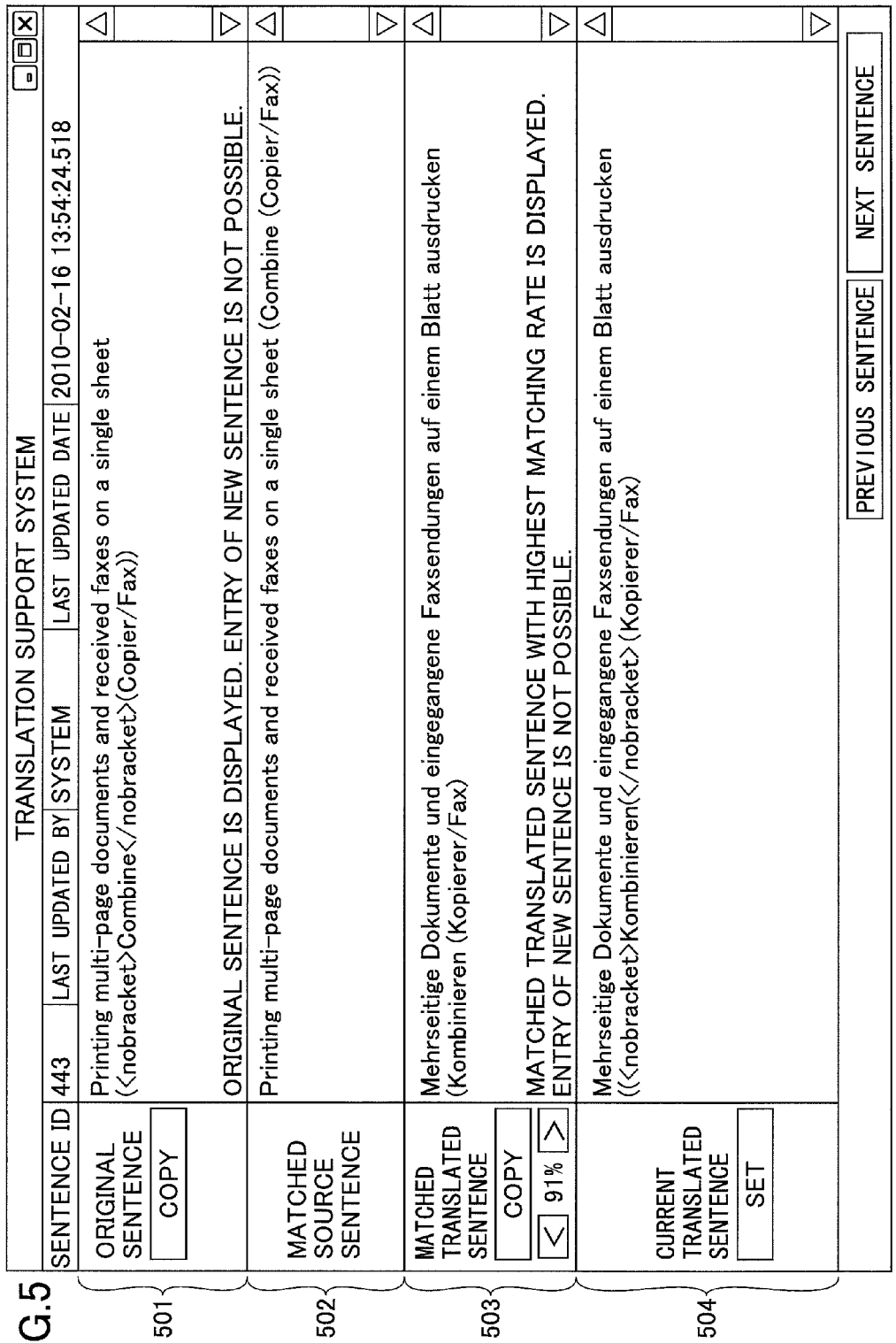
FIG. 5 is a drawing illustrating an example of a translation screen.

FIG. 5 illustrates an exemplary translation screen. In the translation support system 100 of the present embodiment, the translation support server 10 generates a translation screen to allow a translator to translate an original text using the translation screen displayed on the translator terminal 40. On the translation screen, the translator compares an original sentence 31a and a matching source sentence 21a in the translation memory 20 and translates the original sentence 31a using a previously translated sentence 21b associated with the source sentence 21a.

Referring to FIG. 5, an "original sentence" field 501 displays an original sentence 31a (in this example, written in English) to be translated. Although it is assumed in the present embodiment that translation is performed sentence by sentence, translation may be performed in any other units such as paragraphs. A "matched source sentence" field 502 displays a source sentence 21a that is stored in the translation memory 20 and matches the original sentence 31a displayed in the "original sentence" field 501. A "matched translated sentence" field 503 displays a previously translated sentence 21b that is stored in the translation memory 20 and associated with the source sentence 21a displayed in the "matched source sentence" field 502.

In the "matched translated sentence" field 503, "91%" indicates an exemplary matching rate of the original sentence 31a displayed in the "original sentence" field 501 to the source sentence 21a displayed in the "matched source sentence" field 502. It can be assumed that as the matching rate becomes higher, the reliability of the translated sentence 21b displayed in the "matched translated sentence" field 503 becomes higher. Meanwhile, a matching rate of 0% may indicate that there is no matching source sentence 21a in the translation memory 20. In this case, sentences are not displayed in the "matched source sentence" field 502 and the "matched translated sentence" field 503. When a previously translated sentence 21b with a high matching rate is displayed in the "matched translated sentence" field 503, the translator can easily translate the original sentence 31a by copying the translated sentence 21b to a "current translated sentence" field 504 and modifying only a small part of the translated sentence 21b. Meanwhile, when a previously translated sentence 21b with a low matching rate is displayed in the "matched translated sentence" field 503, the translator needs to newly translate a large part of the original sentence 31a, i.e., needs to modify a large part of the translated sentence 21b.

The "current translated sentence" field 504 displays a currently translated sentence 31b that is a result of translating the original sentence 31a displayed in the "original sentence" field 501. As described above, the translator can copy the translated sentence 21b from the "matched translated sentence" field 503 to the "current translated sentence" field 504, edit the copied translated sentence 21b in the "current translated sentence" field 504, and newly enter words in the "current translated sentence" field 504. In a manner as described above, the translator translates all original sentences 31a in an original text file.

The translation support server 10 also generates a proofreading screen (not shown) to allow a proofreader to proofread the translated sentences 31b using the proofreading screen displayed on the proofreader terminal 50. The proofreading screen may have a format similar to that of the translation screen. On the proofreading screen, the proofreader can proofread a currently translated sentence 31b by comparing the currently translated sentence 31b with the corresponding original sentence 31a and the matching source sentence 21a in the translation memory 20.

<Coefficient Table>

FIG. 6 is an example of the coefficient table 32. As described above, the coefficient table 32 may be stored in advance in the translation support DB 30 by, for example, an administrator, and defines coefficients corresponding to matching rates (or matching rate ranges). Accordingly, a coefficient can be obtained from the coefficient table 32 based on a matching rate.

The adjusting unit 13 obtains coefficients corresponding to the matching rates of the counted numbers of words from the coefficient table 32, and multiplies the numbers of words by the obtained coefficients to adjust the numbers of words. Accordingly, the coefficients in the coefficient table 32 are adjustment factors (or weighing factors) for adjusting the numbers of words of the respective matching rates.

<Delivery Period Table>

FIG. 7 is an example of the delivery period table 33. As described above, the delivery period table 33 may be stored in advance in the translation support DB 30 by, for example, an administrator, and defines delivery periods (numbers of days) corresponding to total numbers of words. Accordingly, a delivery period (a number of days) can be obtained from the delivery period table 33 based on a total number of words. The exemplary delivery periods in the delivery period table 33 are determined based on an assumption that a typical translator translates 2000 words a day, and increase linearly as the number of words increases. Here, the translation efficiency of a translator generally improves as the number of words in an original text increases. When this and other conditions are taken into account, the delivery periods in the delivery period table 33 may instead be determined to increase non-linearly as the number of words increases (e.g., one day for 2000 words, nine days for 20000 words).

The delivery period setting unit 15 obtains, from the delivery period table 33, a value indicating the number of days that corresponds to the total number of words calculated by the total-no-of-words calculation unit 14, and sets the obtained value as the delivery period for the original sentences (original text file) 31a. Thus, the delivery period table 33 is used to determine a delivery period based on the adjusted total number of words of the original sentences 31a. When placing an order for translation via the management terminal 60, the delivery period (translation schedule) of the translation is automatically set and displayed on the order screen (see FIG. 4) by the translation support server 10.

First Embodiment

An exemplary process of calculating a delivery period (translation schedule) performed by the translation support server 10 is described below.

Figure 8:
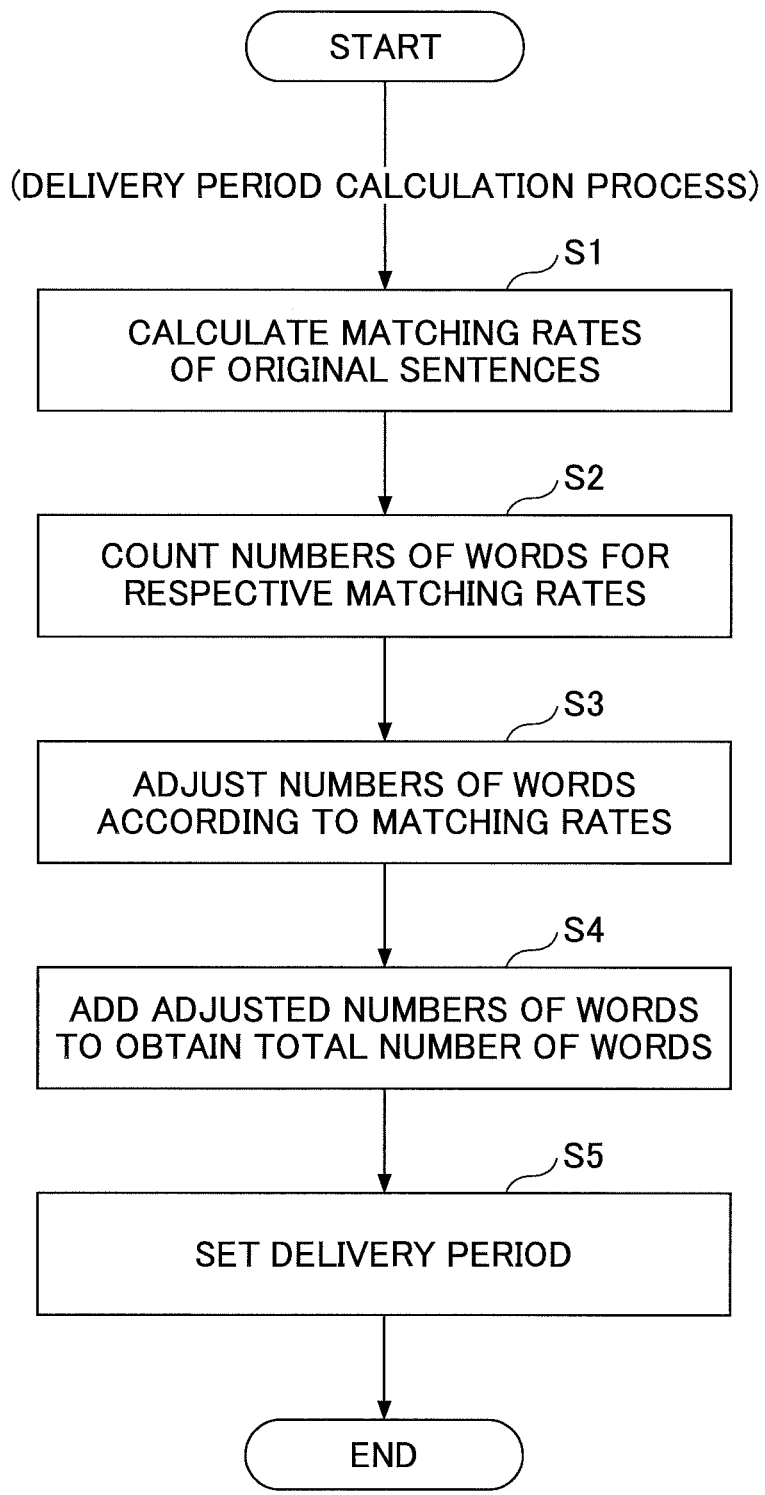
FIG. 8 is a flowchart illustrating an exemplary process of calculating a delivery period.

FIG. 8 is a flowchart illustrating an exemplary process of calculating a delivery period. The process of FIG. 8 is started, for example, when an order for translation is placed on the order screen displayed on the management terminal 60. More specifically, to place an order for translation, a person in charge of a translation project at a manufacturer accesses the translation support server 10 via the management terminal 60 and thereby displays the order screen on a Web browser. Next, the person in charge selects a translation company from the "vendor" field and inputs a file name of an original text to be translated in the "original text" field. Then, the person in charge selects "Automatic (recommended)" 401 in the "delivery period" field. As a result, the process of FIG. 8 is performed by the translation support server 10 to automatically calculate and set a delivery period.

(Step S1)

In step S1, the matching rate calculation unit 11 compares the original sentences 31a in the original text with the source sentences 21a in the translation memory 20, and thereby calculates matching rates indicating how closely the original sentences 31a match the source sentences 21a.

When the original text (file) is input on the order screen, the matching rate calculation unit 11 reads the original text. The matching rate calculation unit 11 obtains a first original sentence 31a from the original text and searches the translation memory 20 for a source sentence 21a that matches the original sentence 31a. Instead of performing the search by itself, the matching rate calculation unit 11 may request the translation support function of the translation support server 10 to search the translation memory 20.

When a source sentence 21a matching the original sentence 31a is found in the translation memory 20, the matching rate calculation unit 11 calculates the matching rate of the original sentence 31a to the found source sentence 21.

FIG. 9 is a drawing used to describe how a matching rate is calculated. Here, let us assume that for an original sentence "This manual uses the following methods", a source sentence "This manual uses the following symbols" is found in the translation memory 20. Five words out of six words of the original sentence match the source sentence, and one word "methods" of the original sentence does not match the word "symbols" of the source sentence. In this case, the matching rate of the original sentence is 83% (=5/6×100) and six words with a matching rate of 83% are detected. More specifically, "This", "manual", "uses", "the", "following", and "methods" in the original sentence are treated as words having a matching rate of 83%. In the manner described above, matching rates of all original sentences 31a (or words) in the original text are calculated.

When translating the original sentence in FIG. 9 using the translation screen (see FIG. 5), the translator can retrieve a previously translated sentence corresponding to the source sentence "This manual uses the following symbols" from the translation memory 20. In this case, the translator needs to translate only the word "methods" (or to replace a previously translated word corresponding to the word "symbols" with a newly translated word). That is, the translator needs to actually translate only one word out of six words. In the related art, however, six words are counted in calculating a delivery period even when only one word needs to be actually calculated.

(Step S2)

After the matching rates of all the original sentences 31a (or words) in the original text are calculated, the counting unit 12, in step S2, counts the numbers of words of the original sentences 31a and thereby obtains the numbers of words for the respective matching rates (or matching rate ranges).

FIG. 10 is a table illustrating exemplary results of counting the numbers of words for respective matching rates. In FIG. 10, it is assumed that the original text (the original sentences 31a) includes multiple chapters, and the numbers of words in respective matching rate ranges are counted for each chapter. For example, in Chapter 1, there are 13587 words in total, 1528 words have a matching rate of 100%, 1388 words are in a matching rate range of 95-99%, 888 words are in a matching rate range of 85-94%, 1191 words are in a matching rate range of 75-84%, 0 words are in a matching rate range of 50-74%, and 8591 words are determined to be unmatched (the matching rate is 49% or lower).

(Step S3)

In step S3, the adjusting unit 13 multiplies the numbers of words of the respective matching rates (or matching rate ranges) by the corresponding coefficients defined in the coefficient table 32 to adjust the numbers of words.

Figure 11:
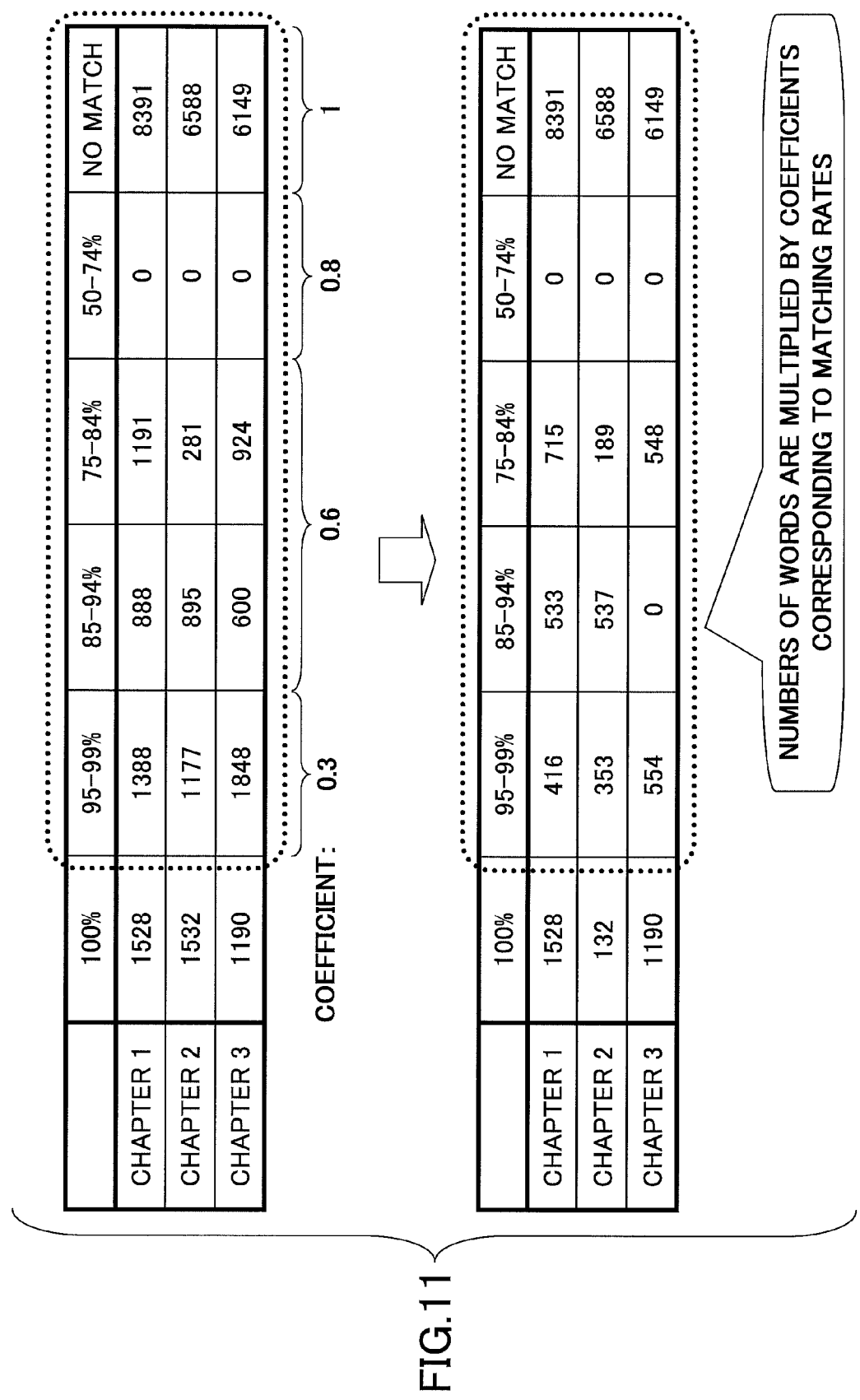
FIG. 11 is a drawing used to describe how the numbers of words are adjusted according to their matching rates.

FIG. 11 is a drawing used to describe how the numbers of words are adjusted according to their matching rates. The adjusting unit 13 obtains (or reads) coefficients corresponding to matching rate ranges from the coefficient table 32 (see FIG. 6). In this example, the adjusting unit 13 obtains 0.3 for the matching rate range 95-99%, 0.6 for the matching rate range 85-94%, 0.6 for the matching rate range 75-84%, 0.8 for the matching rate range 50-74%, and 1 for the matching rate range 0-49% (NO MATCH).

Then, the adjusting unit 13 multiplies the numbers of words in the respective matching rate ranges by the obtained coefficients to adjust the numbers of words. In FIG. 11, for example, the number of words "1388" in the matching rate range 95-99% is multiplied by the coefficient "0.3" and is thereby adjusted to "416". Similarly, the number of words "888" in the matching rate range 85-94% is multiplied by the coefficient "0.6" and is thereby adjusted to "533". The number of words "1191" in the matching rate range 75-84% is multiplied by the coefficient "0.6" and is thereby adjusted to "715". The number of words in the matching rate range 50-74% is "0" and is therefore unchanged. Also, the number of words "8391" in the matching rate range 0-49% is unchanged since the coefficient is "1".

As illustrated in FIG. 11, the numbers of words in Chapters 2 and 3 are also adjusted in a similar manner. Words with a matching rate of 100% in original sentences completely match words in source sentences in the translation memory 20, and can be translated using previously translated sentences associated with the source sentences without change. Said differently, there is no need to translate words with a matching rate of 100%. Therefore, words with a matching rate of 100% are excluded from the number of words (the amount of translation work) in calculating a delivery period.

(Step S4)

In step S4, the total-no-of-words calculation unit 14 adds the adjusted numbers of words of the respective matching rates and thereby calculates a (adjusted) total number of words in the original text (the original sentences 31a).

FIG. 12 is a table illustrating examples of total numbers of words adjusted according to matching rates. In step S3, as described with reference to FIG. 11, the numbers of words of the respective matching rates are adjusted. In step S4, total numbers of words in Chapters 1 through 3 are calculated, and then the total number of words in the original text (the original sentences 31a) is calculated. In this example, the total number of words in Chapter 1 is 10091, the total number of words in Chapter 2 is 7664, the total number of words in Chapter 3 is 7251, and the total number of words in the entire original text is 25009.

Thus, the total number of words of the original text is reduced from an actual total number of words to "25009" as a result of adjusting the numbers of words in step S3. The adjusted total number of words represents the number of words that need to be actually translated. Meanwhile, the actual total number of words includes words that need not be translated. Therefore, the adjusted total number of words is more appropriate than the actual total number of words as a basis for calculating a delivery period.

(Step S5)

In step S5, the delivery period setting unit 15 obtains, from the delivery period table 33, a value indicating the number of days that corresponds to the calculated total number of words, and sets the obtained value as the delivery period. The delivery period setting unit 15 obtains a value indicating the number of days that corresponds to the total number of words calculated in step S4 from the delivery period table 33 (see FIG. 7). In this example, since the total number of words is 25009, the delivery period setting unit 15 obtains "13" (days) from the delivery period table 33 and sets "13" as the delivery period in "Automatic (recommended)" 401 on the order screen of FIG. 4.

As described above, the translation support server 10 of the present embodiment makes it possible to adjust the total number of words in an original text (the original sentences 31a) taking into account how many words can be automatically translated using previously translated sentences in the translation memory 20 (said differently, to calculate the number of words that need to be translated), and to calculate an appropriate delivery period based on the adjusted total number of words (i.e., the adjusted amount of translation work).

In the related art, a delivery period is calculated based simply on the actual number of words in an original text even when the original text is to be translated using a translation memory. In this case, since the original text may include words that need not be translated, a delivery period calculated based on the actual number of words may be longer than necessary.

When a translation tool including a translation memory is used, the translator can automatically translate some parts of an original text using previously translated sentences retrieved from the translation memory, and needs to newly translate only parts of the original text that cannot be translated automatically. The translation support server 10 of the present embodiment makes it possible to calculate an appropriate delivery period based on an actual amount of translation work (i.e., adjusted total number of words).

Second Embodiment

An exemplary process of revising the coefficients in the coefficient table 32 is described below. In the above embodiment, the coefficient table 32 is stored in advance in the translation support DB 30 by, for example, an administrator.

The coefficients in the coefficient table 32 are predetermined based on, for example, a rule of thumb. Here, as the experience of translators or translation companies is accumulated, it is preferable to revise the coefficients to improve their accuracy and thereby to more accurately calculate delivery periods.

FIG. 13 is a table illustrating exemplary delivery results. When translation work is completed and a translated text is delivered by a translation company, the delivery result is recorded in the translation support DB by, for example, the management function of the translation support server 10 which manages the entire schedule of a translation project.

As illustrated in FIG. 13, a delivery result may include the name of an original text translated, adjusted numbers of words in respective matching rate ranges, a set delivery period, an actual delivery period, a translation company name, a source language (the language of an original text), and a target language (the language of a translated text). The set delivery period indicates a delivery period determined by the translation support server 10 when an order is placed, and the actual delivery period indicates a delivery period actually taken by the translation company to deliver the translated text.

With regard to "manual A", the set delivery period is 13 days and the actual delivery period is 11 days. Accordingly, X translation company has delivered the translated text for "manual A" two days ahead of schedule. With regard to "manual B", the set delivery period is 26 days and the actual delivery period is 23 days. Accordingly, X translation company has delivered the translated text for "manual B" three days ahead of schedule. Thus, according to the delivery results, X translation company has been steadily able to deliver translated texts within delivery periods that are shorter than the set delivery periods. In this case, coefficients may be decreased to reduce delivery periods.

With regard to "manual C", the set delivery period is 8 days and the actual delivery period is 12 days. Accordingly, Y translation company has delivered the translated text for "manual C" four days behind schedule. With regard to "manual D", the set delivery period is 13 days and the actual delivery period is 17 days. Accordingly, Y translation company has delivered the translated text for "manual D" four days behind schedule. Thus, according to the delivery results, Y translation company has been unable to deliver translated texts within the set delivery periods. In this case, coefficients may be increased to increase delivery periods.

For the above reasons, the translation support server 10 (the management function) may be configured to regularly refer to delivery results to determine differences between set delivery periods and actual delivery periods (set delivery period—actual delivery period), to obtain an average of the differences, and to modify the coefficients based on the average of the differences. For example, the translation support server reduces the coefficients when the average of the differences is +3 or greater (days) (i.e., greater than a predetermined threshold). Meanwhile, when the average of the differences is −3 or less (days) (i.e., less than a predetermined threshold), the translation support server 10 increases the coefficients.

<Variation>

When a large number of delivery results are accumulated, an average of differences between set delivery periods and actual delivery periods may represent an overall trend for multiple translation projects and translation companies, and therefore can be used as a reliable criterion for revising the coefficients in the coefficient table 32 that is used for all translation companies and projects.

However, as a variation of the second embodiment, coefficient tables 32 may be provided for respective translation companies and may be reviewed independently. For example, when it is determined, based on delivery results, that X translation company has been able to deliver translated texts ahead of set delivery periods, a coefficient table 32 with smaller coefficients may be provided for X translation company.

FIGS. 14A through 14C are exemplary coefficient tables 32 for respective translation companies. FIG. 14A illustrates a coefficient table 32a provided for X translation company. The coefficient table 32a is revised according to delivery results of X translation company.

The coefficient table 32 of FIG. 6 includes a coefficient 0.3 for the matching rate range of 95-99%, a coefficient 0.6 for the matching rate range 85-94%, a coefficient 0.6 for the matching rate range 75-84%, a coefficient 0.8 for the matching rate range 50-74%, and a coefficient 1 for the matching rate range 0-49% (NO MATCH). In the coefficient table 32a for X translation company, the coefficients are reduced to set shorter delivery periods. In this example, the coefficient table 32a includes a coefficient 0.2 for the matching rate range of 95-99%, a coefficient 0.5 for the matching rate range 85-94%, a coefficient 0.5 for the matching rate range 75-84%, a coefficient 0.7 for the matching rate range 50-74%, and a coefficient 1 for the matching rate range 0-49%.

Meanwhile, in a coefficient table 32b of FIG. 14B provided for Y translation company, the coefficients are increased to set longer delivery periods. In this example, the coefficient table 32b includes a coefficient 0.4 for the matching rate range of 95-99%, a coefficient 0.7 for the matching rate range 85-94%, a coefficient 0.7 for the matching rate range 75-84%, a coefficient 0.9 for the matching rate range 50-74%, and a coefficient 1 for the matching rate range 0-49%.

FIGS. 15A and 15B are exemplary coefficient tables 32 for respective target languages. Coefficients may be provided and revised for respective "source languages" and "target languages" of translation, or combinations of them (combinations of source languages and target languages may be called "translation languages"). For example, assuming that translation from English to French is more difficult than translation from English to German due to their language characteristics, it is preferable to provide different coefficient tables 32 for English to German translation and English to French translation. FIG. 15A illustrates a coefficient table 32e for the English to German translation, and FIG. 15B illustrates a coefficient table 32f for the English to French translation. The coefficient table 32e is revised based on delivery results of English to German translation, and the coefficient table 32f is revised based on delivery results of English to French translation.

As described above, the translation support server 10 may be configured to revise (or modify) coefficients in the coefficient table 32 based on accumulated delivery results (or translation results) to improve the accuracy of the coefficients and thereby to more accurately calculate delivery periods. Also, coefficient tables 32 may be provided for respective translation companies, source languages, and/or target languages and may be revised based on their delivery results to improve the accuracy of the coefficients and thereby to more accurately calculate delivery periods.

The above described embodiments may be applied to a method, an apparatus, a system, a computer program, and a storage medium storing the computer program.

An aspect of this disclosure provides a translation support apparatus, a translation delivery period setting method, and a non-transitory machine-readable storage medium storing program code that make it possible to calculate and set an appropriate delivery period for translation work to be performed using a translation tool for retrieving previously translated sentences from a translation memory.

The present invention is not limited to the specifically disclosed embodiments, and variations and modifications may be made without departing from the scope of the present invention.

What is claimed is:

1. An apparatus, comprising:
a storage unit configured to store an original text including original sentences to be translated, a coefficient table defining coefficients associated with matching rates, and a delivery period table defining values indicating numbers of days and associated with total numbers of words;
a translation memory configured to store previously translated sentences in association with source sentences; and
a processor configured to execute a program and thereby implement
a matching rate calculation unit configured to compare the original sentences with the source sentences in the translation memory and thereby calculate the matching rates of the original sentences to the source sentences,
a counting unit configured to count a number of words in each of the original sentences after the matching rates are calculated and thereby obtain numbers of words for the respective matching rates,
an adjusting unit configured to adjust the numbers of words of the respective matching rates by multiplying the numbers of words by the corresponding coefficients defined in the coefficient table,
a total-no-of-words calculation unit configured to add the adjusted numbers of words of the respective matching rates to obtain a total number of words of the original text, and
a delivery period setting unit configured to obtain one of the values corresponding to the obtained total number of words from the delivery period table and to set the one of the values as a delivery period for a translation of the original text.

2. The apparatus as claimed in claim 1, wherein the processor further implements
a management unit configured to
record set delivery periods set by the delivery period setting unit for translations of original texts in association with actual delivery periods of the translations of the original texts,
calculate an average of differences between the set delivery periods and the actual delivery periods, and
if the average of differences is greater than a predetermined threshold, modify the coefficients in the coefficient table.

3. The apparatus as claimed in claim 2, wherein
the management unit is further configured to record translation companies and/or translation languages in association with the set delivery periods and the actual delivery periods; and
the storage unit is configured to store the coefficient tables for the respective translation companies and/or the translation languages.

4. A method performed by an apparatus that includes a translation memory storing previously translated sentences in association with source sentences, the method comprising:
reading, from a storage unit of the apparatus, an original text including original sentences to be translated, a coefficient table defining coefficients associated with matching rates, and a delivery period table defining values indicating numbers of days and associated with total numbers of words;
comparing the original sentences with the source sentences in the translation memory and thereby calculating the matching rates of the original sentences to the source sentences;
counting a number of words in each of the original sentences after the matching rates are calculated and thereby obtaining numbers of words for the respective matching rates;
adjusting the numbers of words of the respective matching rates by multiplying the numbers of words by the corresponding coefficients defined in the coefficient table;
adding the adjusted numbers of words of the respective matching rates to obtain a total number of words of the original text; and
obtaining one of the values corresponding to the obtained total number of words from the delivery period table and setting the one of the values as a delivery period for a translation of the original text.

5. The method as claimed in claim 4, further comprising:
recording set delivery periods set for translations of original texts in association with actual delivery periods of the translations of the original texts;
calculating an average of differences between the set delivery periods and the actual delivery periods; and
if the average of differences is greater than a predetermined threshold, modifying the coefficients in the coefficient table.

6. The method as claimed in claim 5, further comprising:
recording translation companies and/or translation languages in association with the set delivery periods and the actual delivery periods,
wherein the coefficient tables are provided for the respective translation companies and/or the translation languages.

7. A non-transitory computer-readable storage medium storing program code for causing an apparatus, which includes a translation memory storing previously translated sentences in association with source sentences, to perform a method, the method comprising:
reading, from a storage unit of the apparatus, an original text including original sentences to be translated, a coefficient table defining coefficients associated with matching rates, and a delivery period table defining values indicating numbers of days and associated with total numbers of words;
comparing the original sentences with the source sentences in the translation memory and thereby calculating the matching rates of the original sentences to the source sentences;
counting a number of words in each of the original sentences after the matching rates are calculated and thereby obtaining numbers of words for the respective matching rates;
adjusting the numbers of words of the respective matching rates by multiplying the numbers of words by the corresponding coefficients defined in the coefficient table;
adding the adjusted numbers of words of the respective matching rates to obtain a total number of words of the original text; and
obtaining one of the values corresponding to the obtained total number of words from the delivery period table and setting the one of the values as a delivery period for a translation of the original text.

8. The storage medium as claimed in claim 7, the method further comprising:
- recording set delivery periods set for translations of original texts in association with actual delivery periods of the translations of the original texts;
- calculating an average of differences between the set delivery periods and the actual delivery periods; and
- if the average of differences is greater than a predetermined threshold, modifying the coefficients in the coefficient table.

9. The storage medium as claimed in claim 8, the method further comprising:
- recording translation companies and/or translation languages in association with the set delivery periods and the actual delivery periods,
- wherein the coefficient tables are provided for the respective translation companies and/or the translation languages.

\* \* \* \* \*